(12) United States Patent  (10) Patent No.: US 8,739,612 B2
Kawano et al.  (45) Date of Patent: Jun. 3, 2014

(54) WEAR CONTROL APPARATUS AND WIND TURBINE BLADE MONITORING SYSTEM INCLUDING WIND TURBINE BLADE

(71) Applicant: Mitsubishi Heavy Industries, Ltd., Tokyo (JP)

(72) Inventors: Masaya Kawano, Tokyo (JP); Noriyuki Hayashi, Tokyo (JP); Takao Kuroiwa, Tokyo (JP); Nobuyasu Nakamura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/771,533

(22) Filed: Feb. 20, 2013

(65) Prior Publication Data

US 2013/0220005 A1  Aug. 29, 2013

Related U.S. Application Data

(63) Continuation of application No. PCT/JP2013/053133, filed on Feb. 8, 2013.

(30) Foreign Application Priority Data

Feb. 24, 2012 (JP) ................................. 2012-039121

(51) Int. Cl.
  *G01M 15/14* (2006.01)
  *F03D 1/06* (2006.01)
(52) U.S. Cl.
  CPC ............. *G01M 15/14* (2013.01); *F03D 1/0675* (2013.01); *Y02E 10/721* (2013.01)
  USPC ..................................................... 73/112.01
(58) Field of Classification Search
  CPC . Y02E 10/722; Y02E 10/721; F03D 11/0091; F03D 1/0675; F05B 2260/80; F05B 2230/90; G01M 5/0016; G01M 15/14

USPC ........................................................ 73/112.01
See application file for complete search history.

(56) References Cited

U.S. PATENT DOCUMENTS 5,784,978 A * 7/1998 Saiz .......................... 114/102.17
6,623,243 B1 * 9/2003 Hodos ............................ 416/61
(Continued)

FOREIGN PATENT DOCUMENTS

JP  S62-180695 U  11/1987
JP  2000120524 A  4/2000
(Continued)

OTHER PUBLICATIONS

International Search Report of "PCT/JP2013/053133," Apr. 16, 2013.

(Continued)

*Primary Examiner* — Freddie Kirkland, III
(74) *Attorney, Agent, or Firm* — Manabu Kanesaka; Kenneth M. Berner; Benjamin J. Hauptman (57) ABSTRACT

A wind turbine blade used in a wind power generator that receives wind and rotates a rotating shaft of a generator includes at least two layers on a surface of a blade body, one of the layers being colored with a coating material different in color from the blade body and the rest of the layers. The layers are provided at least on a tip, particularly at a front edge of the wind turbine blade. A wind turbine blade monitoring system that monitors the wind turbine blade includes: an imaging unit that images the wind turbine blade in a predetermined position over a predetermined period at timing when the wind turbine blade passes through the predetermined position; and an indication unit that chronologically indicates imaging results of the wind turbine blade imaged by the imaging means.

8 Claims, 6 Drawing Sheets

(56) References Cited

U.S. PATENT DOCUMENTS

| | | | | |
|---|---|---|---|---|
| 6,945,751 | B1* | 9/2005 | Wobben | 416/61 |
| 8,025,480 | B1* | 9/2011 | King | 416/5 |
| 8,270,667 | B2* | 9/2012 | Fritz et al. | 382/100 |
| 8,418,560 | B2* | 4/2013 | Faidi et al. | 73/606 |
| 2004/0151578 | A1 | 8/2004 | Wobben | |
| 2004/0202885 | A1* | 10/2004 | Seth et al. | 428/565 |
| 2009/0220795 | A1* | 9/2009 | Connelly et al. | 428/414 |
| 2011/0116906 | A1* | 5/2011 | Smith et al. | 415/1 |
| 2012/0076345 | A1* | 3/2012 | Fritz et al. | 382/100 |
| 2013/0071252 | A1* | 3/2013 | Nissen | 416/224 |
| 2013/0149154 | A1* | 6/2013 | Kuroiwa et al. | 416/146 R |

FOREIGN PATENT DOCUMENTS

| | | |
|---|---|---|
| JP | 2002-39051 A | 2/2002 |
| JP | 2003-512567 A | 4/2003 |
| JP | 2006-132542 A | 5/2006 |
| JP | 2009068383 A | 4/2009 |
| JP | 2009-133240 A | 6/2009 |
| JP | 2010185444 A | 8/2010 |
| JP | 2010229824 A | 10/2010 |

OTHER PUBLICATIONS

Written Opinion of the International Search Report.

* cited by examiner

WEAR CONTROL APPARATUS AND WIND TURBINE BLADE MONITORING SYSTEM INCLUDING WIND TURBINE BLADE

CROSS REFERENCE TO RELATED APPLICATIONS

This is a continuation of International Application PCT/JP2013/53133, with an international filing date of Feb. 8, 2013, which is hereby incorporated by reference herein in its entirety.

TECHNICAL FIELD

The present invention relates to a wear control apparatus and a wind turbine blade monitoring system including a wind turbine blade.

BACKGROUND ART

A wind power generator is conventionally known that uses wind power as natural energy to generate power. The wind power generator includes a rotor head having a wind turbine rotary blade (hereinafter referred to as "wind turbine blade") mounted to a nacelle provided on a column, a main shaft coupled to the rotor head to rotate with the rotor, a speed-increasing gear coupled to the main shaft rotated by wind power applied to the wind turbine blade, and a generator driven by shaft output power of the speed-increasing gear, and the parts are appropriately supported by a bearing. In the wind power generator having such a configuration, the rotor head including the wind turbine blade, which converts wind power into torque, and the main shaft are rotated to generate the shaft output power, and shaft output power with an increased number of rotations is transferred to the generator via the speed-increasing gear coupled to the main shaft. Thus, the shaft output power obtained by converting wind power into torque is used as a drive source of the generator, thereby allowing power generation using wind power as power of the generator.

In the above described wind power generator, particularly, a wind turbine blade has become longer than conventional ones because of a recent increase in size of the wind power generator. Such a wind turbine blade having an increased length is recently devised to be colored such that the wind turbine blade is coated with an ultraviolet reflection coating to prevent birds from accidentally colliding with a rotating wind turbine blade (for example, see PTL 1), or that the wind turbine blade is colored blue as a daytime sky color or with a greenish color to be harmonized with a background of a wind power generation facility and look smaller (for example, PTL 2 and PTL 3).

Since rain or dust in air repeatedly collides with the wind turbine blade, a surface of the wind turbine blade is deformed and deteriorated, and a material is gradually eliminated. This may cause erosion that is wear reducing a thickness. In particular, for an off-shore wind power generator provided on the ocean, a wind turbine blade may be affected by salt corrosion. Thus, conventionally, in regular inspections of the wind power generator, an operator visually checks a degree of wear during a stop of rotation of the wind turbine blade, and performs maintenance when there is serious wear.

CITATION LIST

Patent Literature (PTL 1)
Japanese Laid-open Patent Publication No. 2002-39051

(PTL 2)
Japanese Laid-open Patent Application, Publication No. 2006-132542

(PTL 3)
Japanese Laid-open Patent Publication No. 2003-512567

SUMMARY OF INVENTION

Technical Problem

However, by the conventional method, wear can be checked only during the stop of rotation of the wind turbine blade, and it is difficult to grasp a state of wear during an operation of the wind power generator.

Solution to Problem

The present invention is made in view of the aforementioned circumstances, and has an object to provide a wind turbine blade that can reliably indicate to a user a state of wear of a wind turbine blade even during an operation of a wind power generator, a method for manufacturing the wind turbine blade, and a wind power generator and a wind turbine blade monitoring system including the wind turbine blade.

To achieve the above described object, the present invention adopts means described below.

A first aspect of the present invention provides a wind turbine blade of a wind power generator that receives wind and rotates a rotating shaft of a generator, comprising:
at least two layers on a surface of a blade body, one of the layers being colored with a coating material different in color from the blade body and the rest of the layers.

With such a configuration, the wind turbine blade of the wind power generator receives wind and rotates the rotating shaft of the generator, and one of the at least two layers on the surface of the blade body of the wind turbine blade is colored with the coating material different in color from the blade body and the rest of the layers.

As such, the layers colored with the coating material different in color from the blade body are formed on the surface of the blade body. Thus, if raindrops or dust in air has an impact on the surface of the wind turbine blade to cause deformation or deterioration, and a color different from those of the layers (a color of the blade body, for example, a base color of FRP (Fiber Reinforced Plastics)) is exposed on the surface, occurrence of erosion can be quickly grasped. Since the two or more layers having different colors are provided on the surface of the blade body, it can be checked to which layer among the plurality of layers wear reaches based on the color exposed on the surface. Further, the difference in color of the wind turbine blade indicates whether the wind turbine blade wears, and thus wear can be indicated to a user even during an operation of the wind power generator including such a wind turbine blade.

The layers on the wind turbine blade may be provided on a tip of the wind turbine blade.

The tip of the wind turbine blade quickly wears because of a higher peripheral speed than in other regions. Thus, providing the layers on the tip of the wind turbine blade allows wear of the wind turbine blade to be grasped at appropriate timing.

Also, the layers are provided only on the tip, thereby reducing an amount of coating material used as compared to a case where the entire wind turbine blade is coated with the coating material, and reducing cost.

The layers on the wind turbine blade may be provided at least at a front edge on the tip of the wind turbine blade.

It is estimated that the front edge of the wind turbine blade particularly wears because raindrops or dust in air directly collides with the front edge. Thus, the layers are provided at least at the front edge, thereby reliably grasping erosion of the wind turbine blade.

The coating material for coloring the layers of the wind turbine blade may have erosion resistance.

Coloring with the coating material having erosion resistance can delay progression of erosion as compared to coloring with a coating material having no erosion resistance. The coating material having erosion resistance (wear-resistant coating material) is, for example, a two-component curing agent containing a mixture of an epoxy base resin and an amine curing agent for hardening, and an example of a product is BELZONA 1341 (Supermetalglide) (a set of a base resin and a curing agent) manufactured by BELZONA.

The two or more layers of the wind turbine blade may be coatings applied with a thickness of a predetermined control value, respectively.

When the thickness of each the plurality of layers is previously determined from the predetermined control value, a depth of wear can be estimated based on the color exposed on the surface.

A second aspect of the present invention provides a wear control apparatus including: imaging means for imaging a wind turbine blade described above in a predetermined position at timing when the wind turbine blade passes through the predetermined position; and indication means for indicating imaging results of the wind turbine blade imaged by the imaging means.

The imaging results of the wind turbine blade imaged at the timing when the wind turbine blade passes through the predetermined position are indicated, thus presence or absence of wear of the wind turbine blade, and an area (degree) of the wear, if present, can be grasped, and the degree of wear can be accurately estimated.

The imaging means of the wear control apparatus may image the wind turbine blade over a predetermined period for output, and the indication means may chronologically indicate the imaging results by the imaging means.

The imaging results are chronologically indicated, and thus progression of wear from past to present can be grasped.

The wear control apparatus may include: obtaining means for obtaining chronological-order data of weather observation information containing an amount of rainfall and an amount of yellow sand; and comparison indication means for comparably indicating the chronological-order data of the weather observation information obtained by the obtaining means, and an amount of change of wear region estimated from the imaging data of the wind turbine blade imaged by the imaging means.

The weather observation information containing an amount of rainfall and an amount of yellow sand can be compared with the amount of change of wear region of the imaging data obtained by the imaging means to determine whether progression of wear is related to weather when the wind turbine blade wears. When the progression of wear is related to weather (for example, the wind turbine blade is monthly imaged for one year, and it is estimated that a wear rate is high in a month with large amount of rainfall), it can be estimated that a factor of the wear is erosion, and a coating material resistant to the estimated factor (for example, material less affected by water) can be used to provide appropriate erosion resistance.

The imaging means of the wear control apparatus may be movable.

The imaging means for imaging the wind turbine blade is movable rather than stationary, and thus one imaging means can image wind turbine blades of a plurality of wind power generators. Also, the imaging means may be placed in a movable device, for example, a vehicle, a ship, or the like.

A third aspect of the present invention provides a wind power generator including a wind turbine blade described above.

A fourth aspect of the present invention provides a wind turbine blade monitoring system including a wear control apparatus described above.

A fifth aspect of the present invention provides a method for manufacturing a wind turbine blade of a wind power generator that receives wind and rotates a rotating shaft of a generator, including the step of forming at least two layers on a surface of a blade body, in which one of the layers is colored with a coating material different in color from the blade body and the rest of the layers.

Advantageous Effects of Invention

The present invention has an effect of reliably indicating to a user a state of wear of the wind turbine blade even during an operation of the wind power generator.

DESCRIPTION OF EMBODIMENTS

Now, embodiments of a wind turbine blade, a method for manufacturing the wind turbine blade, and a wind power generator and a wind turbine blade monitoring system including the wind turbine blade according to the present invention will be described with reference to the drawings.

[First Embodiment]

Figure 1:
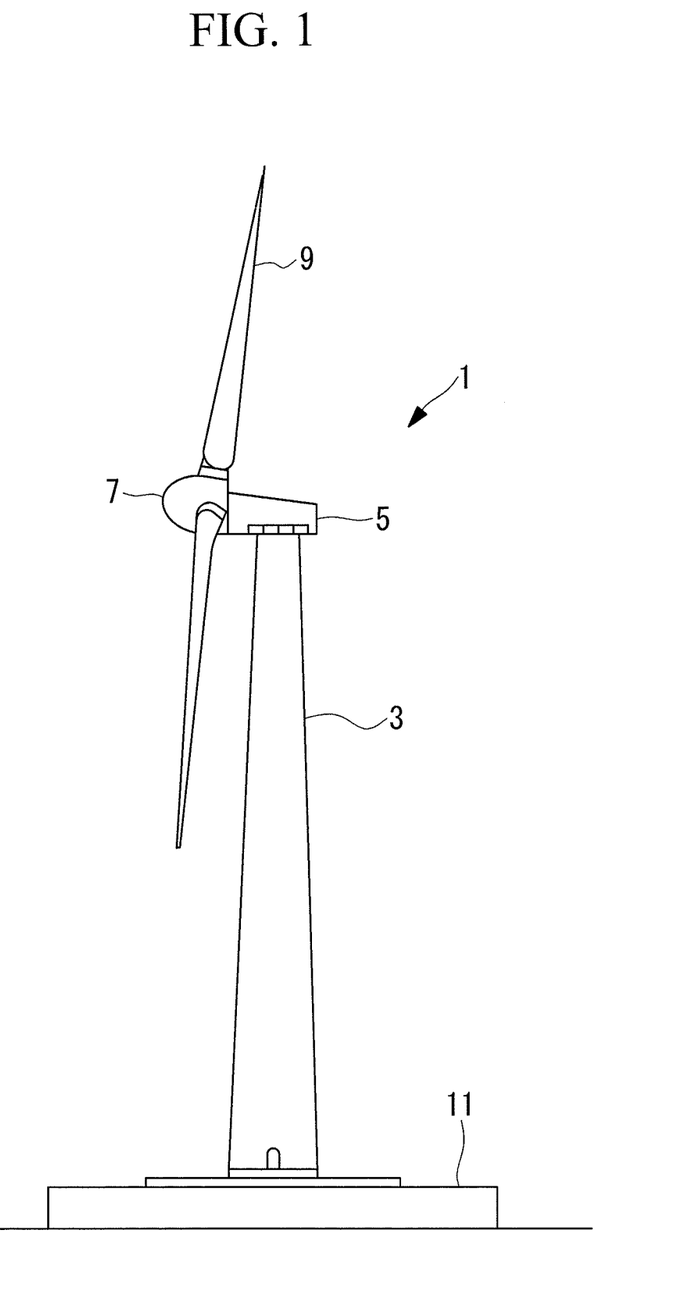
FIG. 1 shows a schematic configuration of a wind power generator according to a first embodiment.
Figure 2:
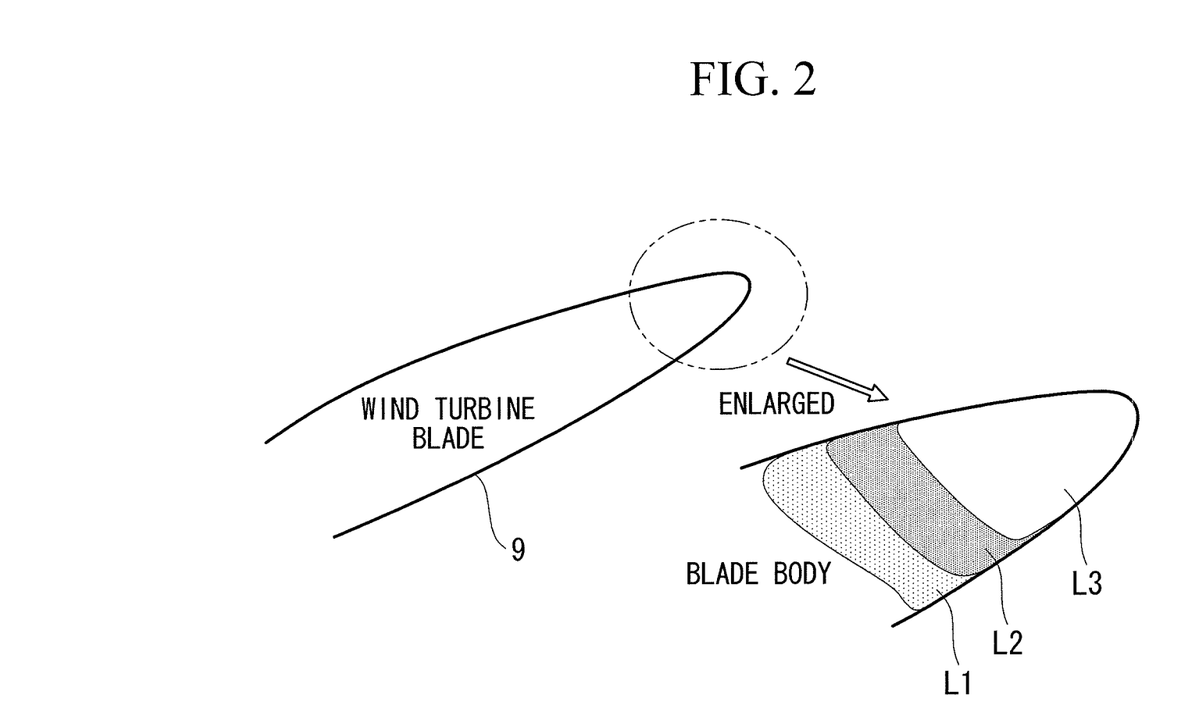
FIG. 2 illustrates layers on a wind turbine blade according to the first embodiment.

With reference to FIGS. 1 and 2, a wind power generator 1 according to a first embodiment of the present invention will be described. FIG. 1 is a side view showing an overall schematic configuration of the wind power generator 1. As shown in FIG. 1, the wind power generator 1 includes a column 3 standing on a foundation 11, a nacelle 5 provided on an upper end of the column 3, a rotor head 7 provided on the nacelle 5 rotatably around a substantially horizontal axis, and a plurality of, for example, three wind turbine blades 9 mounted in radial directions around the rotation axis of the rotor head 7. Wind power applied to the wind turbine blade 9 from a direction of the rotation axis of the rotor head 7 is converted into power for rotating the rotor head 7 around the rotation axis. In the nacelle 5, a generator is provided to be coupled to the rotor head 7 via a coaxial speed-increasing gear, although those elements are not shown. Specifically, rotation of the rotor head 7 is increased in speed by the speed-increasing gear to drive the generator, thereby outputting generator output power from the generator.

The wind turbine blade 9 includes at least two layers on a surface of a blade body, and one of the layers is colored with a coating material different in color from the blade body and the rest of the layers. In this embodiment, the layers are provided only in a predetermined region on a tip of the wind turbine blade 9.

The layers on the wind turbine blade 9 are preferably provided at least at a front edge. It is estimated that the front edge of the wind turbine blade particularly wears because raindrops or dust in air directly collides with the front edge. Thus, the layers are provided at least at the front edge, thereby reliably grasping erosion of the wind turbine blade.

FIG. 2 is an enlarged view of the colored layers on the wind turbine blade 9. As shown in FIG. 2, in this embodiment, three layers are provided on the surface of the blade body, and the layers and the blade body each have different colors. For example, the blade body is white, a first layer L1 from the surface of the blade body is red, a second layer L2 is yellow, and a third layer L3 is blue. The first layer L1, the second layer L2, and the third layer L3 are coatings each applied with a thickness of a predetermined control value, and each have, for example, a thickness of 100 µm. The predetermined control value herein is an example and not particularly limited.

In this embodiment, the case where the three layers are provided on the surface of the blade body is described as an example, but the number of layers is not particularly limited. At least two layers may be provided, and two layers or four or more layers may be provided.

As described above, the colored layers in which the blade body and the layers each have different colors are provided on the surface of the blade body. Thus, when blue is exposed, wear is within 100 µm, when yellow is exposed, wear is 100 to 200 µm, and when red is exposed, wear is 200 to 300 µm, and progression of wear can be grasped.

As described above, according to the wind turbine blade 9, a method for manufacturing the wind turbine blade 9, and a wind power generator 1 including the wind turbine blade 9 of this embodiment, the three layers provided on the surface of the blade body of the wind turbine blade 9 are colored differently with each other, with colors other than that of the blade body. As such, the layers colored with coating materials different in color from the blade body are formed on the surface of the blade body. Thus, if raindrops or dust in air has an impact on the surface of the wind turbine blade to cause deformation or deterioration, and a color different from that of the layers (a color of the blade body, for example, a base color of FRP (Fiber Reinforced Plastics)) is exposed on the surface, occurrence of erosion can be quickly grasped. Since the two or more layers are provided on the surface of the blade body, wear of the blade body can be reduced.

Each layer is applied with a thickness of a predetermined control value (for example, 100 µm), and thus a depth of wear can be estimated based on the color exposed on the surface.

As described in this embodiment, the layers are provided only on the tip of the wind turbine blade 9, thereby reducing an amount of coating material used as compared to a case where the entire wind turbine blade is coated with the coating material, and reducing cost.

The coating material for forming the layers in this embodiment may be a colorable coating material, and more preferably, a coating material having erosion resistance. The coating material having erosion resistance can be used to provide high resistance to erosion, and increase the life of the wind turbine blade 9 as compared to that with a general coating material. The coating material having erosion resistance (wear-resistant coating material) is, for example, a two-component curing agent containing a mixture of an epoxy base resin (base) and an amine curing agent for hardening, and an example of a product is BELZONA 1341 (Supermetalglide) (a set of a base resin and a curing agent) manufactured by BELZONA.

[Second Embodiment]

Next, with reference to FIGS. 3 and 4, a second embodiment of the present invention will be described.

This embodiment is different from the first embodiment in that a wear control apparatus is provided in addition to the above described wind power generator. With reference to FIGS. 3 and 4, the wind power generator and a wind turbine blade monitoring system including the power generator of this embodiment will be described mainly for different points from the first embodiment, with descriptions on the same points being omitted.

Figure 3:
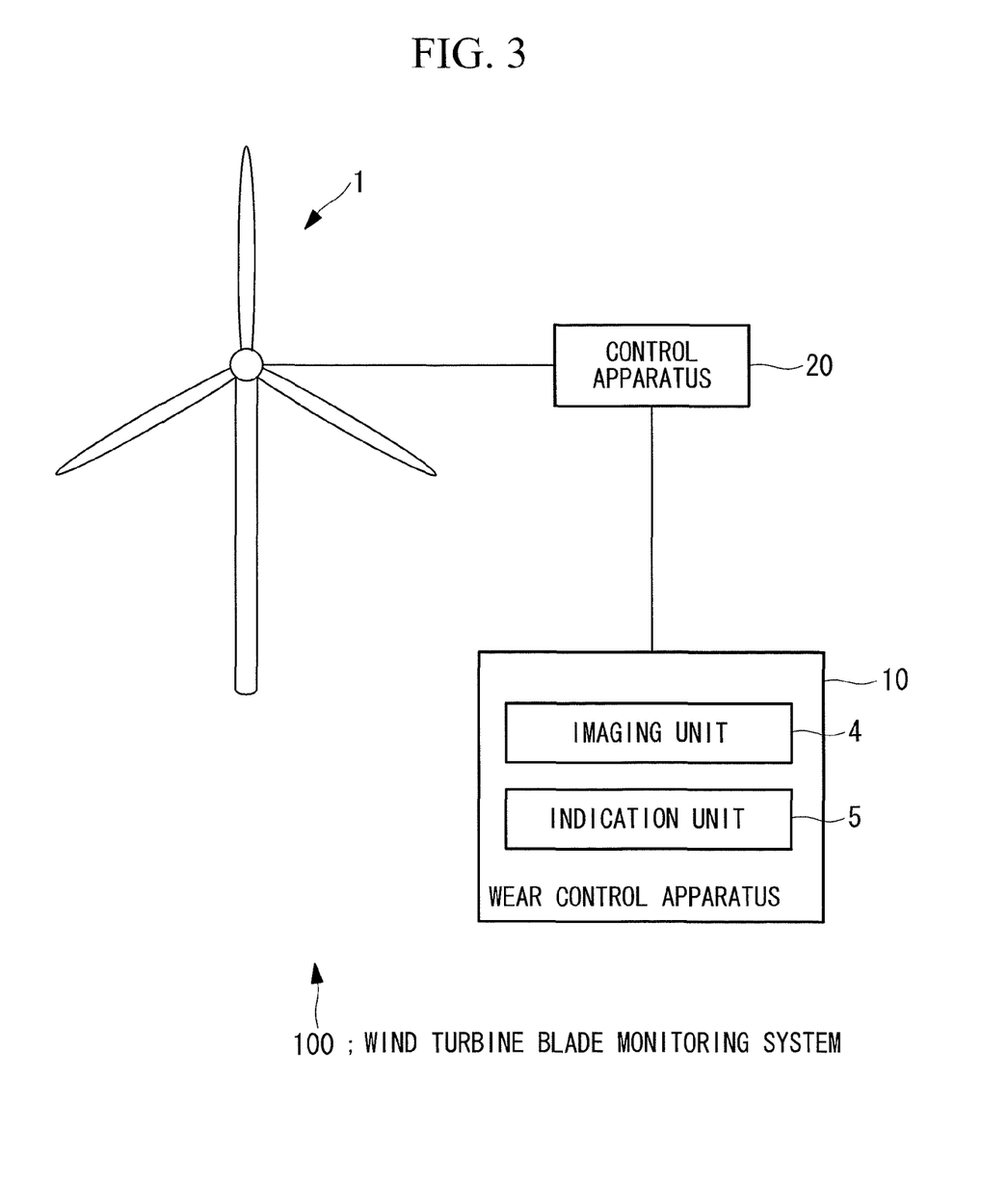
FIG. 3 shows a schematic configuration of a wind turbine blade monitoring system according to a second embodiment of the present invention.

FIG. 3 shows a schematic configuration of a wind turbine blade monitoring system 100 according to this embodiment. The wind turbine blade monitoring system 100 includes a wind power generator 1, a control apparatus 20, and a wear control apparatus 10. In the wind turbine blade monitoring system 100, the wind power generator 1, the control apparatus 20, and the wear control apparatus 10 are communicatably connected with each other.

In the wind power generator 1, two layers are provided on a surface of a blade body across a wind turbine blade 9. For example, the blade body of the wind power generator 1 is white, a first layer from the surface of the blade body is red, and a second layer is gray.

The control apparatus 20 obtains a rotation signal of a generator from the wind power generator 1 in which the wind turbine blade rotates, and outputs an imaging command to an imaging unit 4 when detecting the rotation signal as a trigger.

The wear control apparatus 10 includes the imaging unit (imaging means) 4 and an indication unit (indication means) 5.

The imaging unit 4 images the wind turbine blade 9 in a predetermined position at timing when the wind turbine blade passes through the predetermined position, and outputs imaging data as an imaging result to the indication unit 5. The imaging unit 4 images the wind turbine blade 9 regularly (for example, every time the wind turbine blade passes through the predetermined position) over a predetermined period for output, thereby outputting chronological-order imaging data.

The indication unit 5 indicates the imaging result of the wind turbine blade 9 imaged by the imaging unit 4. For example, the indication unit 5 displays the imaging result on a display. A controller can see the imaging result on the display without stopping the on-site wind power generator 1, and can check wear of the wind power generator 1 during an operation.

Figure 4:
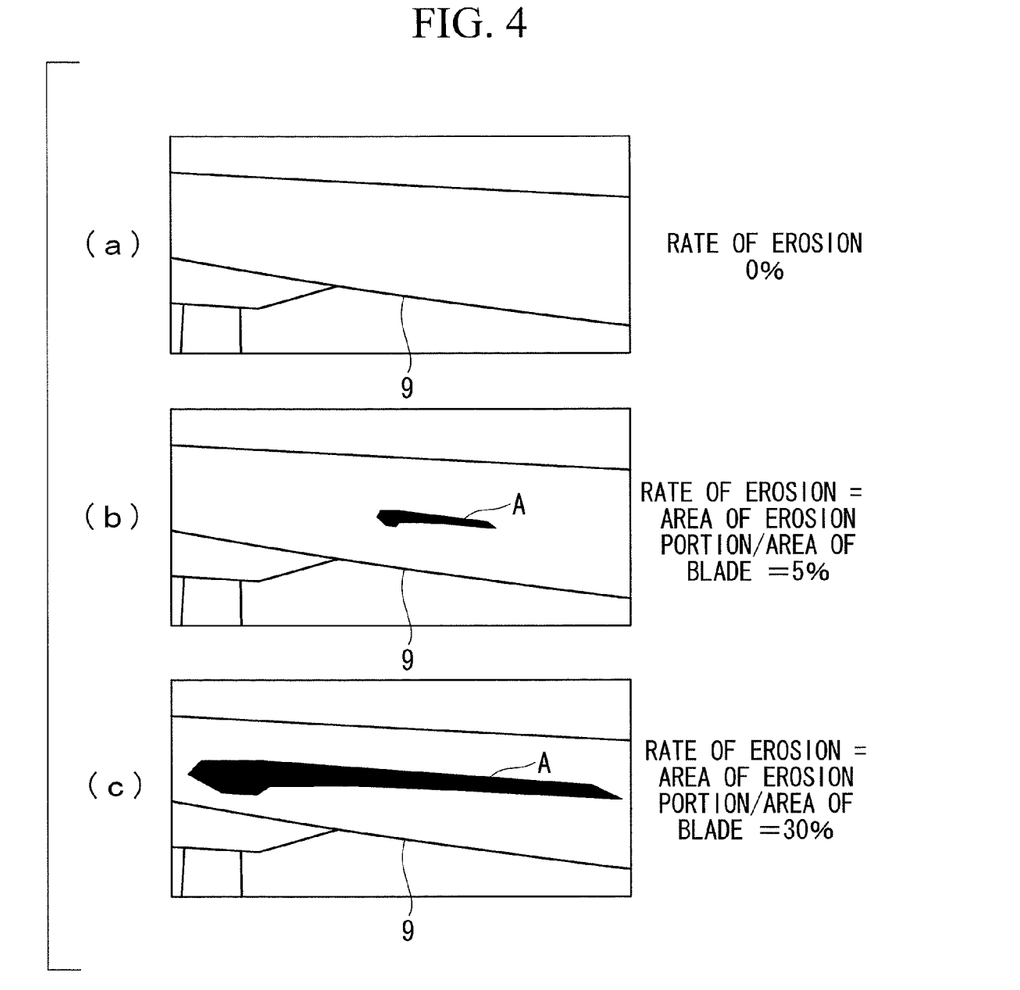
FIG. 4 chronologically shows imaging results over a predetermined period.

FIG. 4 shows an example in which imaging data of the wind turbine blade 9 imaged over a predetermined period is chronologically indicated (a lapse of time is shown downward). FIG. 4(a) shows imaging data at beginning of imaging, and a wear rate is 0%. FIG. 4(b) shows imaging data about one month after the beginning of the imaging, and the wear rate is about 5%. FIG. 4(c) shows imaging data about six months after the beginning of the imaging, and the wear rate is about 30%. The wear rate is a rate of an area of a region A with detection of wear (hereinafter referred to as "wear region") with respect to an area of the entire blade (hereinafter referred to as "blade area"), and is calculated by dividing the wear region A by the blade area (see Formula (I) below). The area of the wear region is calculated from color information or the like of the imaging data.

$$\text{wear rate (\%)} = \{\text{area } A \text{ of wear region (red)/blade area (white)}\} \times 100 \quad (1)$$

In this embodiment, the rate of the area of the wear region with respect to the blade area is the wear rate as an example, but other methods for calculating the wear rate can be employed. For example, when imaging data of the same size can be obtained each time, the rate of the area of the wear region with respect to an area of an imaging rage of the obtained imaging data may be the wear rate.

Operations of the wind turbine monitoring system 100 according to this embodiment will be described below.

When the wind turbine blade 9 rotates and a rotation signal of the generator is input to the control apparatus 20, the control apparatus 20 outputs an imaging command to the imaging unit 4 when obtaining rotation signal as a trigger. Based on the imaging command, imaging data of the wind turbine blade 9 imaged regularly at timing when the wind turbine blade 9 passes through the predetermined position is output to the indication unit 5. The indication unit 5 chronologically indicates the obtained imaging data on a screen such as a window, and indicates the wear rate calculated from the imaging data.

The controller can monitor a state of wear based on the imaging data and information of the wear rate, or the like indicated by the indication unit.

As described above, according to the wind turbine blade 9, the method for manufacturing the wind turbine blade 9, and the wind power generator 1 and the wind turbine blade monitoring system 100 including the wind turbine blade 9 of this embodiment, the imaging results of the wind turbine blade 9 imaged at the timing when the wind turbine blade 9 passes through the predetermined position are indicated, and thus presence or absence of wear of the wind turbine blade 9, and an area (degree) of the wear region, if present, can be visually and quantitatively estimated. The imaging results are chronologically indicated, and thus progression of wear from past to present can be grasped. Further, the state of wear is indicated by the indication unit 5, and thus an operator can grasp the state of wear online without going to a site of the wind power generator 1.

[Third Embodiment]

Figure 5:
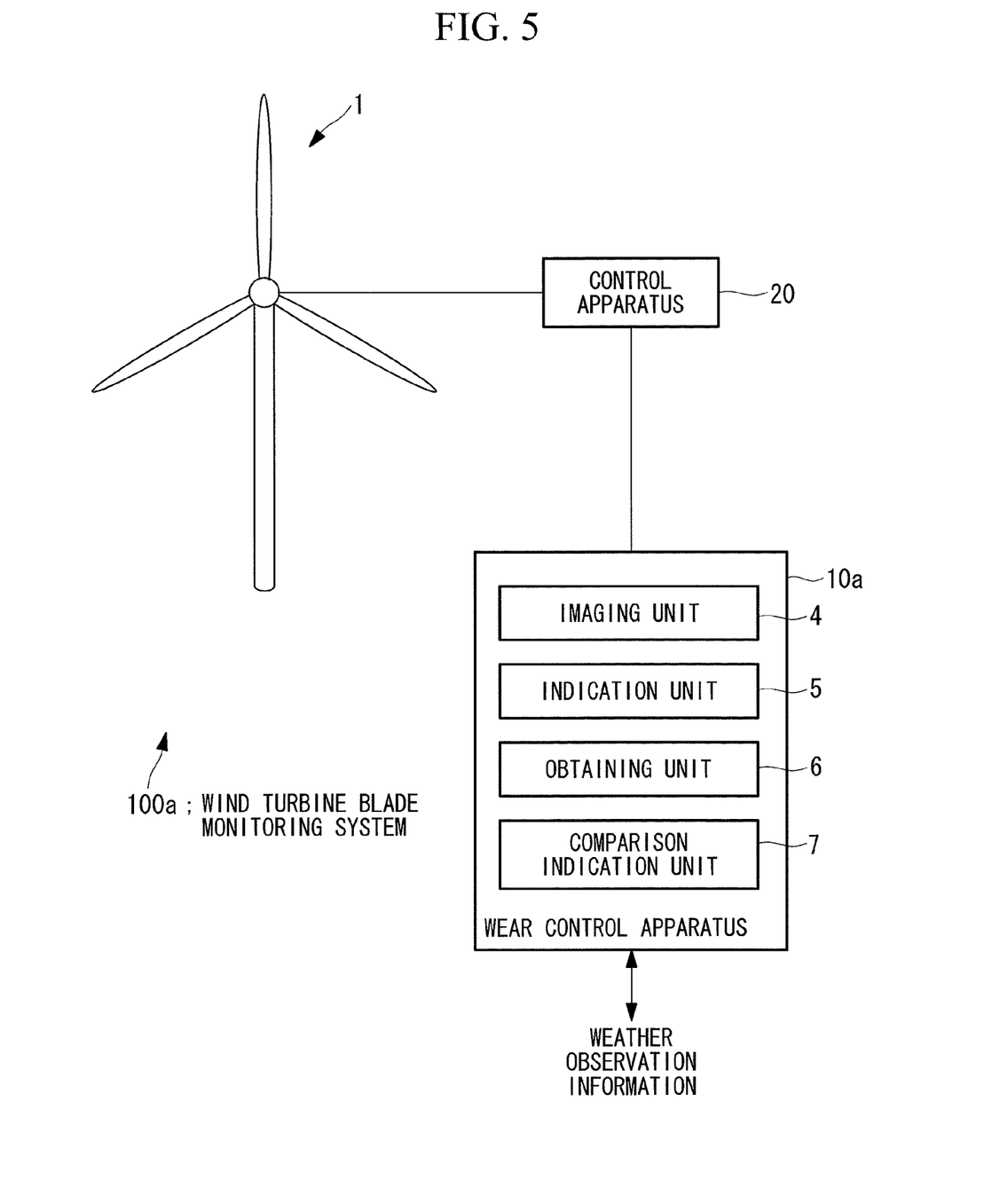
FIG. 5 shows a schematic configuration of a wind turbine blade monitoring system according to a third embodiment of the present invention.
Figure 6:
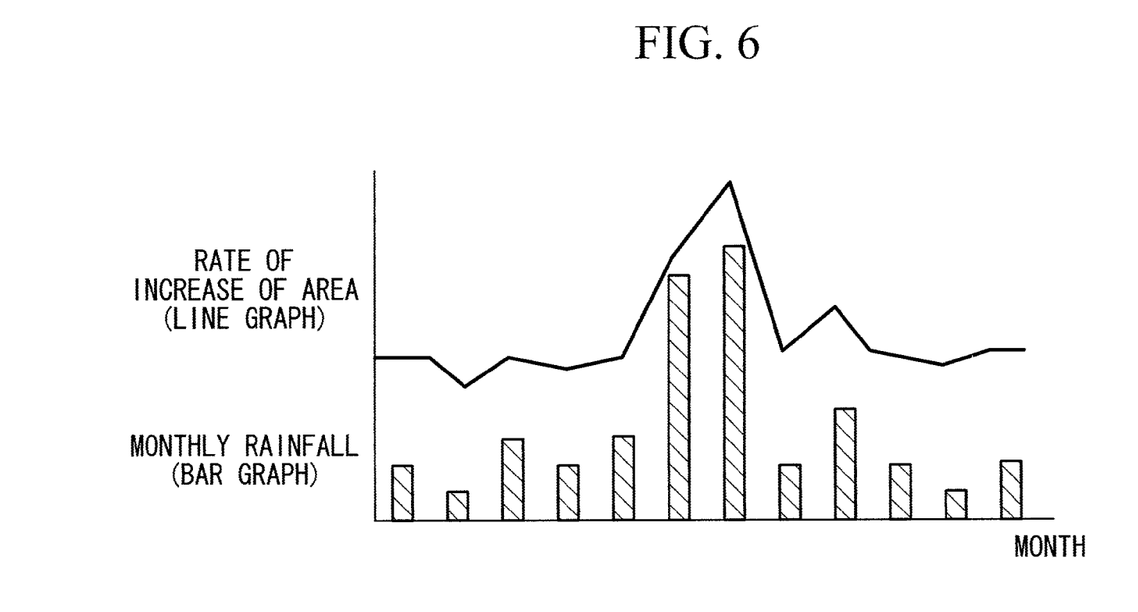
FIG. 6 shows a relationship between an area of wear and rainfall.

A wear control apparatus of this embodiment is different from the first and second embodiments in that a comparison indication unit (comparison indication means) is provided so that it comparably indicates chronological-order data of weather observation information and changes of wear. With reference to FIGS. 5 and 6, a wind turbine blade monitoring system of this embodiment will be described mainly for different points from the first and second embodiments, with descriptions on the same points being omitted.

As shown in FIG. 5, a wear control apparatus 10a includes an obtaining unit (obtaining means) 6 and a comparison indication unit (comparison indication means) in addition to the configuration in the above described second embodiment.

The obtaining unit 6 obtains chronological-order data of weather observation information containing an amount of rainfall and an amount of yellow sand. Specifically, the obtaining unit 6 obtains information of weather data provided by the Meteorological Agency at predetermined timing.

The comparison indication unit 7 comparably indicates the chronological-order data of the weather observation information obtained by the obtaining unit 6, and an amount of change of wear region estimated from imaging data of the wind turbine blade 9. The amount of change of wear region is an amount of change of an area of the wear region. The amount of change of an area of the wear region is calculated based on an area of the wear region calculated from color information or the like of the imaging data.

FIG. 6 shows an amount of change of an area of the wear region (line graph) calculated from the imaging data (imaging data of 12 months are monthly indicated) of the wind turbine blade 9 imaged by the imaging unit 4, and monthly rainfall (bar graph) of weather observation information one above the other.

As shown in FIG. 6, an increase in an area of wear matches an increase in rainfall, and thus it can be estimated that a main factor of wear confirmed from the imaging data is droplet erosion due to rain.

As such, when the wind turbine blade 9 wears, the weather observation information containing an amount of rainfall and an amount of yellow sand can be compared with the imaging data obtained by the imaging unit 4 to determine whether progression of wear is related to weather. If the progression of wear is related to weather, and for example, the wind turbine blade is monthly imaged for one year, and it is indicated that the wear rate is high in a month with large amount of rainfall, it can be estimated that a factor of the wear is droplet erosion due to water, and a coating material resistant to the estimated factor (for example, material which is less affected by water) can be appropriately used to provide erosion resistance.

MODIFIED EXAMPLE

In the above described second and third embodiments, a case where the imaging unit 4 is secured to the wear control apparatus 10 is described as an example, but a placement position of the imaging unit 4 is not limited to the aforementioned. For example, the imaging unit 4 may be provided in a movable facility such as a vehicle or a ship, and passage timing of the wind turbine blade 9 may be obtained with infrared rays to match imaging timing with a passage time of the wind turbine blade. As such, the imaging unit 4 is movable, and thus one imaging unit 4 can monitor a plurality of wind power generator in a wind farm or the like in which the plurality of wind power generator are provided.

Reference Signs List
1 wind power generator
4 imaging unit (imaging means)
5 indication unit (indication means)
6 obtaining unit (obtaining means)
7 comparison indication unit (comparison indication means)
9 wind turbine rotary blade (wind turbine blade)
10, 10a wear control apparatus
100, 100a wind turbine blade monitoring system

The invention claimed is:
1. A wear control apparatus comprising:
an imaging device for imaging a wind turbine blade of a wind power generator in a predetermined position at timing when the wind turbine blade passes through the predetermined position, the wind turbine blade having at least two layers on a surface of a blade body thereof, one of the layers being colored with a coating material different in color from the blade body and the rest of the layers; and
an indication device for indicating imaging results of the wind turbine blade imaged by the imaging device,
wherein the imaging device images the wind turbine blade over a predetermined period and outputs the imaging results, and the indication device indicates the imaging results by the imaging device in a chronological order.

2. The wear control apparatus according to claim 1, wherein the layers are provided on a tip of the wind turbine blade.

3. The wear control apparatus according to claim 1, wherein the layers are provided at least at a front edge on a tip of the wind turbine blade.

4. The wear control apparatus according to claim 1, wherein the coating material for coloring the layers has erosion resistance.

5. The wear control apparatus according to claim 1, wherein each of the two or more layers is coatings applied with a thickness of a predetermined control value.

6. A wear control apparatus comprising:
an imaging device for imaging a wind turbine blade of a wind power generator in a predetermined position at timing when the wind turbine blade passes through the predetermined position, the wind turbine blade having at least two layers on a surface of a blade body thereof, one of the layers being colored with a coating material different in color from the blade body and the rest of the layers; and
an indication device for indicating imaging results of the wind turbine blade imaged by the imaging device,
an obtaining device for obtaining chronological-order data of weather observation information containing an amount of rainfall and an amount of yellow sand; and
a comparison indication device for comparably indicating the chronological-order data of the weather observation information obtained by the obtaining device, and an amount of change of wear region estimated from the imaging data of the wind turbine blade imaged by the imaging device.

7. The wear control apparatus according to claim 1, wherein the imaging device is movable.

8. A wind turbine blade monitoring system comprising the wear control apparatus according to claim 1.

* * * * *